(12) United States Patent
Jenkner et al.

(10) Patent No.: US 6,713,186 B1
(45) Date of Patent: Mar. 30, 2004

(54) FLUOROALKYL-FUNCTIONAL ORGANOSILOXANE-CONTAINING COMPOSITIONS BASED ON ALCOHOL, A PROCESS FOR THEIR PREPARATION AND THEIR USE

(75) Inventors: Peter Jenkner, Rheinfelden (DE); Albert-Johannes Frings, Rheinfelden (DE); Michael Horn, Rheinfelden (DE); Eckhard Just, Rheinfelden (DE); Jaroslaw Monkiewicz, Rheinfelden (DE); Burkhard Standke, Loerrach (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 09/685,341

(22) Filed: Oct. 11, 2000

Related U.S. Application Data

(62) Division of application No. 08/984,162, filed on Dec. 3, 1997.

(30) Foreign Application Priority Data

Dec. 3, 1996 (DE) .......................... 196 49 954

(51) Int. Cl.⁷ .................. B32B 15/00; B32B 29/00; C08G 77/24
(52) U.S. Cl. .................. 428/447; 528/21; 528/42
(58) Field of Search .................. 428/447, 21, 42; 528/21, 42

(56) References Cited

U.S. PATENT DOCUMENTS 3,012,006 A * 12/1961 Holbrook et al. .......... 427/387
4,024,306 A * 5/1977 Takamizawa et al. ........ 427/387
4,529,774 A * 7/1985 Evans et al. ................. 524/860
5,266,222 A    11/1993 Willis et al.
5,442,011 A * 8/1995 Halling ........................ 524/873
5,446,115 A * 8/1995 Kobayashi ................... 428/446
5,489,328 A * 2/1996 Ono et al. ...................... 106/2

FOREIGN PATENT DOCUMENTS

EP    0 629 673       12/1994
JP    09-176622 A  *  7/1997
WO    WO 96/06895      3/1996

* cited by examiner

*Primary Examiner*—Robert Dawson
*Assistant Examiner*—Marc S. Zimmer
(74) *Attorney, Agent, or Firm*—Oblon, Spivak, McClelland, Maier & Neustadt, P.C.

(57) ABSTRACT

An alcoholic fluoroalkyl-functional group containing organosiloxane based composition prepared is prepared by the controlled hydrolysis of at least one fluoroalkyl-functional group containing organosilane of formula I:

$$R^1-Y-(CH_2)_2SiH_x(R^2)_y(OR)_{3-x-y} \qquad (I),$$

in which $R^1$ is a mono, oligo- or perfluorinated alkyl group having 1–9 C atoms or a mono-, oligo- or perfluorinated aryl group, Y is a $CH_2$, O or S group, $R^2$ and R are each independently a linear, branched or cyclic alkyl group having 1–8 C atoms or an aryl group and x=0, 1 or 2 and y=0, 1 or 2, where $(x+y) \leq 2$, at a temperature in the range of 0–120° C. over a period of 0.5–24 hours and with thorough mixing in an w alcoholic medium which contains water and a weak mono- or polybasic acid or a weak base or a weak mono- or polybasic acid and a weak base or an acid or basic salt, the water employed and the alkoxysilane employed being in a molar ratio of 2–500:1.

6 Claims, No Drawings

FLUOROALKYL-FUNCTIONAL ORGANOSILOXANE-CONTAINING COMPOSITIONS BASED ON ALCOHOL, A PROCESS FOR THEIR PREPARATION AND THEIR USE

This application is a divisional of prior application U.S. Ser. No. 08/984,162, filed on Dec. 3, 1997.

BACKGROUND OF THE INVENTION

1. Field of the Invention

The present invention relates to fluoroalkyl-functional organosiloxane-containing compositions based on alcohol, to a process for their preparation and to their use.

2. Description of the Background

Organosilanes of the formula R'—Si(R")$_3$, where R' is a fluorinated organic radical and R" is a chlorine or methoxy or ethoxy group, have diverse uses, for example, in the application of hydrophobically and oleophobically acting layers on surfaces. Such coatings and impregnations can be produced at the worksite, for example, by dipping, impregnating, spraying or rolling operations.

It is also known that oil- and water-repellent coatings on surfaces, usually glass surfaces, can be produced with fluoroalkylalkoxysilanes. The coatings can be used, for example, as a dirt-repellent treatment on plate glass. The processes described are based on sol-gel processes, very fine inorganic particles being produced and employed together with the fluoroalkylalkoxysilane. Application of such systems is technically demanding, and usually uses complex organic solvent mixtures and additives. Moreover, such systems comprise chlorine and furthermore only remain fit to use for a relatively short period of time (European Laid-Open Application No. 0 658 525, European Laid-Open Application No. 0 629 673 and U.S. Pat. No. 5,424,130).

Since the processes employed are sol-gel process embodiments, which are demanding both in their use and economically, their commercial utilization has to date been limited to niche areas. Furthermore, there are narrow time limits with respect to processability and, therefore, the subsequent efficacy of such fluoroalkylsilane containing formulations on a substrate surface. These factors are an impediment to broader use of the formulation in practice. In addition, a partial to complete loss of adhesive action can be experienced, and a slow phase separation up to laminar deposition of a fluoroalkylsilane-containing phase can occur.

The complicated application processes and, also the use of solvents such as fluorinated hydrocarbons or fluorohydrocarbons, therefore, are disadvantages of such processes (European Laid-Open Application No. 0 491 251, European Laid-Open Application No. 0 493 747).

In the case of the known solvent-based systems, it must be noted that although some systems are stable over the long term in the non-hydrolyzed state, they are distinguished by an efficacy limited to a maximum of a few days in the hydrolyzed form because of the progressive polycondensation of the silanol functions. When formulations are prepared in which the content of silanol groups is continuously reduced in order to reduce the undesired polycondensation, the extent of chemical bonding by the silanol groups to a substrate surface is furthermore reduced, this subsequently manifesting itself in unsatisfactory adhesion of the coating to the substrate surface. A need, therefore, continues to exist for an aqueous organosilane solution which is stable over prolonged periods of time and which provides coated substrates with both hydrophobic and oleophobic properties.

SUMMARY OF THE INVENTION

Accordingly, one object of the present invention is to provide aqueous organosilane formulations which can be prepared in a simple and economical manner and which are essentially free of chlorine, and furthermore have adequate stability over relatively long periods of time, and which simultaneously impart hydrophobic and oleophobic properties on substrate surfaces by an impregnation process which is easy to carry out.

Briefly, this object and other objects of the present invention as hereinafter will become more readily apparent can be attained by an alcoholic fluoroalkyl-functional group containing organosiloxane based composition prepared by the controlled hydrolysis of at least one fluoroalkyl-functional group containing organosilane of formula I:

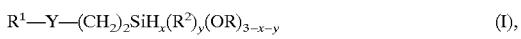

$$R^1—Y—(CH_2)_2SiH_x(R^2)_y(OR)_{3-x-y} \qquad (I),$$

in which $R^1$ is a mono, oligo- or perfluorinated alkyl group having 1–9 C atoms or a mono-, oligo- or perfluorinated aryl group, Y is a $CH_2$, O or S group, $R^2$ and R are each independently a linear, branched or cyclic alkyl group having 1–8 C atoms or an aryl group and x=0, 1 or 2 and y=0, 1 or 2, where (x+y)≦2, at a temperature in the range of 0–120° C. over a period of 0.5–24 hours and with thorough mixing in an alcoholic medium which, contains water, and a weak mono- or polybasic acid or a weak base or a weak mono- or polybasic acid and a weak base or an acid or basic salt, the water employed and the alkoxysilane employed being in a molar ratio of 2–500:1.

DETAILED DESCRIPTION OF THE PREFERRED EMBODIMENTS

It has been found, surprisingly, that aqueous organosiloxane-containing compositions which contain Si-bonded fluoroalkyl functional groups are accessible in a simple and economical manner as chlorine-free, homogeneous, clear solutions which are stable for several months if at least one fluoroalkyl-functional group containing organosilane of formula I:

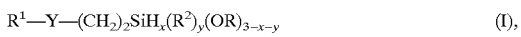

$$R^1—Y—(CH_2)_2SiH_x(R^2)_y(OR)_{3-x-y} \qquad (I),$$

in which $R^1$ is a mono-, oligo- or perfluorinated alkyl group having 1–9 C atoms or a mono-, oligo- or perfluorinated aryl group, Y is a $CH_2$, O or S group, $R^2$ and R are each independently a linear, branched or cyclic alkyl group having 1–8 C atoms or an aryl group and x=0, 1 or 2 and y=0, 1 or 2, where (x+y)≦2, is hydrolyzed in a controlled manner, with thorough mixing, in an alcoholic medium which, in addition to water, comprises a weak mono- or polybasic acid or a weak base or a weak mono or polybasic acid and a weak base or an acid or basic salt, at a temperature in the range of 0–120° C. and over a period of 0.5–24 hours, the water and the alkoxysilane of formula I being employed in a molar ratio of 2–500:1. The compositions of the invention furthermore can be employed for simultaneous hydrophobization and oleophobization of substrate surfaces in a simple manner with an outstanding action. Compositions of the invention preferably have a pH of 2–12, particularly preferably a pH of 3–10, and normally have a viscosity of less than 10,000 mpas. The content of alcohols in the compositions of the invention is preferably 40–99.999% by weight, based on the total composition, the composition preferably comprising fluoroalkylfunctional organosiloxanes in amounts of 0.001–30% by weight, particularly preferably 0.01–5% by weight, and especially preferably 0.1–2% by weight, based on the composition.

Another aspect of the present invention relates to a process for the preparation of a fluoroalkyl-functional organosiloxane containing composition, which comprises subjecting at least one fluoroalkyl-functional organosilane of formula I:

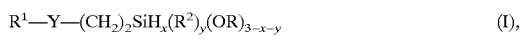

$$R^1-Y-(CH_2)_2SiH_x(R^2)_y(OR)_{3-x-y} \quad (I),$$

in which $R^1$ is a mono-, oligo- or perfluorinated alkyl group having 1–9 C atoms or a mono-, oligo- or perfluorinated aryl group, Y is a $CH_2$, O or S group, $R^2$ and R are each independently a linear, branched or cyclic alkyl group having 1–8 C atoms or an aryl group and x =0, 1 or 2 and y=0, 1 or 2, where (x+y)≦2, to controlled hydrolysis with thorough mixing, in an alcoholic medium which, in addition to water, comprises a weak mono- or polybasic acid or a weak base or a weak mono or polybasic acid and a weak base or an acid or basic salt, at a temperature in the range of 0–120° C. and over a period of 0.5–24 hours, preferably 1–12 hours, particularly preferably over a period of 2–6 hours, the water and the alkoxysilane being employed in a molar ratio of 2–500:1.

In the process of the invention, the fluoroalkylfunctional group containing organosilane of formula I is preferably metered into the reacting medium in portions with periodic interruptions. However, the metering operation can also be carried out continuously with periodic interruptions, or the batchwise and continuous procedures for the metering can be combined with one another in a suitable manner.

The reaction is in general carried out at a temperature within the range of 0–120° C., preferably in a temperature range of 10–80° C., particularly preferably of 20–60° C. The reaction medium is normally stirred.

In the process according to the invention, the pH of 2–12 in the reaction medium is suitably established by employing a weak mono- or polybasic acid or a weak base or a weak mono- or polybasic acid and a weak base or an acid or basic salt.

The weak base employed in the process of the invention is an organosilane of formula II:

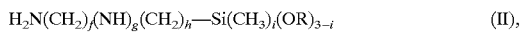

$$H_2N(CH_2)_f(NH)_g(CH_2)_h-Si(CH_3)_i(OR)_{3-i} \quad (II),$$

in which 0≦f≦6, g=0 if f=0 and g=1 if f>1, 0≦h≦6, 0≦i≦1 and R is a linear, branched or cyclic alkyl group having 1–8 C atoms or an aryl group, or an alkylamine of formula III:

$$H_{3-z}NR^3_z \quad (III)$$

in which $R^3$ is a linear, branched or cyclic alkyl group having 1–8 C atoms or a linear, branched or cyclic aminoalkyl group having 1–8 C atoms or an aryl group, z=1, 2 or 3 and groups $R^3$ are identical or different.

Particularly preferred examples of the organosilane include aminopropyltriethoxysilane, aminopropyltrimethoxysilane, aminopropylmethyldiethoxysilane and aminopropylmethyldimethoxysilane. Of the trialkylamines, preferred are mono-, di- and trialkylamines, preferably $C_{1-3}$ alkyl groups.

Weak acids such as formic acid, acetic acid, propionic to acid or citric acid, can also be employed in the process of the invention. If weak acids and weak bases are employed simultaneously, it is not necessary to maintain an equimolar ratio between acid and base.

In the process of the invention, acid salts which can be employed include, for example, alkali metal hydrogen sulfate or dihydrogen phosphate or aluminum acetate, and basic salts which can be employed include, for example, magnesium hydroxide or alkali metal acetate or alkali metal bicarbonate or alkali metal carbonate.

The reaction medium of the present process is preferably the alcohol corresponding to the alkoxy group of the organosilane employed; methanol, n-propanol, i-propanol, n-butanol, i-butanol, t-butanol and/or 2-mothoxyethanol. Ethanol is particularly employed.

Linear perfluoroalkylalkoxysilanes are preferred in the present process such as, for example, perfluorododecyl/perfluorodecyl/perfluorooctyltrialkoxysilanes, in particular perfluorooctyltriethoxysilane, and those fluoroalkyl-functional organosilanes which, according to formula I, contain $CF_3(CF_2)_7-$, $CF_3(C_6H_4)_6-$, $C_6F_5-$ or $R^fCH_2CH_2(C=O)-$, where $R^f=C_nF_{2n+1}$ and n=2–18, as the group $R^1$, for example $F_{13}C_6(CH_2)_2Si(OC_2H_5)_3$. Particularly preferred are tridecafluoro-1,1,2,2-tetrahydrooctyltrimethoxysilane and tridecafluoro-1,1,2,2-tetrahydrooctyltriethoxysilane and 3,3,4,4,5,5,6,6,7,7,8,8,9,9,10,10,10-heptadecafluoro-1,1,2,2-tetrahydrodecyltriethoxysilane and mixtures thereof.

Products prepared by the present process are stable and as a rule exist as clear solutions. The compositions of the invention can be diluted with alcohols in any ratio as desired, and can comprise water in amounts of up to 5% by weight.

The present fluoroalkyl-functional organosiloxanes preferably have a high concentration of silanol functional groups, on the basis of their oligomeric structure, which render them capable, in an outstanding manner, of reaction with substrate surfaces containing hydroxyl groups. Coatings and impregnations with various substrates resulted in excellent oil- and simultaneously water-repellent properties, even after treatment with heat, surfactants and UV, the examples. In appropriate studies on various materials, the present compositions have shown no reduction in efficacy or destabilization even after >6 months.

The compositions of the invention or prepared by the present process are used with significant advantages over the products of the prior art. Using the composition of the invention, at the same time a hydrophobizing, oleophobizing and dirt- and color-repellent action can be achieved in a simple and outstanding manner on the most diverse substrate substances, in particular on glass, for example, plate glass, glass fibers, and glass beads, fillers and pigments, metals, plastics, coatings and paints, textile fibers, including cotton, wood, paper, mineral fibers and mineral building materials such as lime, sandstone, concrete, brick and ceramic. The present compositions can furthermore also be used as release agents, as crosslinking agents, as adhesion promoters, in particular for fluorine polymers, such as, for example, Teflon or coatings based on fluorine polymers, and as additives for paints and coatings. Corresponding processes for surface treatment using compositions of the invention can UFW in general be carried out with little industrial expenditure or expenditure on time.

The present invention, therefore, also relates to the use of the alcohol solvent based fluoroalkyl functional group containing organosiloxane-containing compositions based on alcohol of the invention for hydrophobizing and oleophobizing and simultaneously providing a dirt- and color-repellent treatment of surfaces, of plastics, of metals, of textiles, leather, cellulose and starch products and of mineral building materials, for protecting buildings and facades, for coating glass fibers, for silanizing fillers and pigments, for improving the rheological properties of polymer dispersions and emulsions, and for use as release agents, as crosslinking agents, as adhesion promoters and as additives for paints and coatings.

Having generally described this invention, a further understanding can be obtained by reference to certain specific examples which are provided herein for purposes of illustration only and are not intended to be limiting unless otherwise specified.

EXAMPLE 1

A 10 g amount of $H_2O$ (0.56 mol) is mixed with 5 g of HCOOH (pure: 0.11 mol) in a 250 ml glass beaker at room temperature, while stirring, and 160 g of ethanol (3.5 mol) are then added, a and a pH of about 3.5–4 being established. Thereafter, 10 g of VPS 8261 (3,3,4,4,5,5,6,6,7,7,8,8,8-tridecafluoro-1,1,2,2-tetrahydrooctyltriethoxysilane) are added dropwise (0.02 mol) w and the mixture is subsequently stirred for 5 hours with no further change in pH. Thereafter, the material balance is established at a total weight of 1000 g with 915 g of ethanol (19.9 mol).

A clear, colorless solution which has a content of 1.0% by weight of VPS 8261 and a storage stability of at least 6 months is obtained.

Comparison Example

The procedure is as described in Example 1, but HCOOH is replaced by 1 molar HCl (pH≦1). A milky cloud thus formed after 48–72 hours, and thereafter a significant phase separation takes place within 2 weeks. After this period, the composition appears only slightly cloudy, but with a translucent, waxy layer which settles on the base and walls of containers of both glass and plastic.

EXAMPLE 2

A 10 g amount of $H_2O$ (0.56 mol) is mixed with 4.0 g of $CH_3COOH$ (pure: 0.09 mol) in a 250 ml glass beaker at room temperature, while stirring, and 2.0 g (pure: 0.03 mol) of isobutylamine is added, a pH of 4.5–5 being established. Thereafter, the material balance is established with 50 g of ethanol (1.1 mol). A 5 g amount of 3,3,4,4,5,5,6,6,7,7,8,8,9,9,10,10,10-heptadecafluoro-1,1,2,2-tetrahydrodecyltriethoxysilane) is added dropwise (0.008 mol) and the mixture is subsequently stirred for 5 hours with no further change in pH. Thereafter, the material balance is established at a total weight of 500 g with 429 g of ethanol (94.4 mol).

A clear, colorless solution which has a content of 1.0% by weight of 3,3,4,4,5,5,6,6,7,7,8,8,9,9,10,10,10-heptadecafluoro-1,1,2,2-tetrahydrodecyltriethoxysilane and a storage stability of at least 6 months is obtained.

EXAMPLE 3

A 25 g amount of $H_2O$ (1.4 mol) is mixed with 5 g of HCOOH (pure: 0.11 mol) in a 250 ml glass beaker at room temperature, while stirring, 10 g of DYNASYLANG® 1203 (3-aminopropyltriethoxysilane) are added dropwise (0.07 mol) and 50 g of ethanol (1.1 mol) are then added. A pH of about 8.0 is established. Thereafter, 5 g of VPS 8261 (3,3,4,4,5,5,6,6,7,7,8,8,8-tridecafluoro-1,1,2,2-tetrahydrooctyltriethoxysilane) (0.01 mol) are added dropwise and the mixture is subsequently stirred for 5 hours (no further change in pH). Thereafter, the material balance is established at a total weight of 750 g with 655 g of ethanol (8.8 mol).

A clear, colorless solution which has a content of 0.67% by weight of VPS 8261 and a storage stability of at least 4 months is obtained.

EXAMPLE 4

A 15 g amount of DYNASYLAN® 1203 (3-aminopropyltriethoxysilane) (0.045 mol) is mixed with 5 g of VPS 8261 (3,3,4,4,5,5,6,6,7,7,8,8,8-tridecafluoro-1,1,2,2-tetrahydrooctyltriethoxysilane) (0.07 mol) and 50 g of ethanol (1.1 mol) in a 250 ml glass beaker at room temperature. Thereafter, 25 g of $H_2O$ are added with continued stirring. A pH of about 9–10 is established. The mixture is subsequently stirred for a further 5 hours (no further change in pH) and the material balance is established at a total weight of 500 g with 405 g of ethanol (8.8 mol).

A clear, colorless solution which has a content of 1.0% by weight of VPS 8261 and a storage stability of at least 4 months is obtained.

EXAMPLE 5

Using the solutions of Examples 1–4, coatings were produced on glass sheets, steel sheets, aluminum foils, copper sheets, cardboard, paper and polyester and impregnations were produced on cellulose, wood, leather and cotton.

In order to treat these materials, the substrate specimens were immersed in the ready-to-use solutions of Examples 1–4 for about 5 minutes and, after removal, the solvents were removed at 120° C. in a drying cabinet over a period of about 30 minutes.

Thereafter, the substrate specimens showed significant hydro- and oleophobic properties. These characteristics are demonstrated, inter alia, by the following properties:

Beading effect of heating oil, silicone oil, water, contact angle>100°, "anti-graffiti", "anti-soiling", "anti-fouling". Even after storage of the formulations for several months at room temperature, with varying moisture contents and under the influence of daylight, substrates treated with the formulations exhibit these favorable characteristics.

The disclosure of German priority Application No. 196 49 954.2 filed Dec. 3, 1996 is hereby incorporated by reference into the application.

Obviously numerous modifications and variations of the present invention are possible in light of the above teachings. It is, therefore, to be understood that within the scope of the appended claims, the invention may be practiced otherwise than as specifically described herein.

What is claimed as new and is desired to be secured by Letters Patent of the United States is:

1. A method of hydrophobizing and oleophobizing and for simultaneously providing a dirt- and color-repellent treatment of surfaces, of plastics, of metal, of textiles, leather, cellulose and starch products, and of mineral building materials, comprising:

preparing a fluoroalkyl-functional group containing organosiloxane based composition, which is essentially chlorine free, by the controlled hydrolysis of at least one fluoroalkyl-functional group containing organosilane of formula Ia or Ib:

(Ia) or

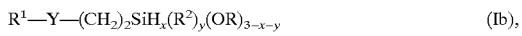

(Ib), in which $R^1$ is a mono-, oligo- or perfluorinated alkyl group having 1–9 C atoms or a mono-, oligo- or perfluorinated aryl group, Y is $CH_2$, O or S groups, $R^2$ and R are each independently a linear, branched or cyclic alkyl group having 1–8 C atoms or an aryl group and x=0, 1 or 2 and y=0, 1 or 2, where (x+y)≦2, at a temperature in the range of 0–120° C. over a period of 0.5–24 hours and with thorough mixing in an alcoholic medium which contains water and (1) a weak base or (2) a weak mono- or polybasic acid and a weak base, wherein said weak base of (1) and (2) is an alkylamine of formula(III):

$$H_{3-z}NR_z^3 \quad (III),$$

wherein $R^3$ is a linear, branched or cyclic alkyl group having 1–8 C atoms or a linear, branched or cyclic aminoalkyl group having 1–8 C atoms or an aryl group, z=1, 2 or 3 and groups $R^3$ are identical or different, or (3) an acidic or basic salt, the water and alkoxysilane employed being in a molar ratio of 2–500:1; and then applying the prepared fluoroalkyl-functional group containing organosiloxane based composition to such materials.

2. A method of protecting buildings and facades, comprising:

preparing a fluoroalkyl-functional group containing organosiloxane based composition, which is essentially chlorine free, by the controlled hydrolysis of at least one fluoroalkyl-functional group containing organosilane of formula Ia or Ib:

$$R^1\text{—}(CH_2)_2Si(R^2)_y(OR)_{3-y} \quad (Ia) \text{ or}$$

$$R^1\text{—}Y\text{—}(CH_2)_2SiH_x(R^2)_y(OR)_{3-x-y} \quad (Ib),$$

in which $R^1$ is a mono-, oligo- or perfluorinated alkyl group having 1–9 C atoms or a mono-, oligo- or perfluorinated aryl group, Y is a $CH_2$, O or S group, $R^2$ and R are each independently a linear, branched or cyclic alkyl group having 1–8 C atoms or an aryl group and x=0, 1 or 2 and y=0, 1 or 2, where (x+y)≦2, at a temperature in the range of 0–120° C. over a period of 0.5–24 hours and with thorough mixing in an alcoholic medium which contains water and (1) a weak base or (2) a weak mono- or polybasic acid and a weak base, wherein said weak base of (1) and (2) is and alkylamine of formula (III):

$$H_{3-z}NR_z^3 \quad (III),$$

wherein $R^3$ linear, branched or cyclic alkyl group having 1–8 C atoms or a linear, branched or cyclic aminoalkyl group having 1–8 C atoms or an aryl group, z=1, 2 or 3 and groups $R^3$ are identical or different, or (3) an acidic or basic salt, the water and alkoxysilane employed being in a molar ratio of 2–500:1; and then applying the prepared fluoroalkyl-functional group containing organosiloxane based composition to buildings and facades.

3. A method of silanizing fillers and pigments, comprising:

preparing a fluoroalkyl-functional group containing organosiloxane based composition, which is essentially chlorine free, by the controlled hydrolysis of at least one fluoroalkyl-functional group containing organosilane of formula Ia or Ib:

$$R^1\text{—}(CH_2)_2Si(R^2)_y(OR)_{3-y} \quad (Ia) \text{ or}$$

$$R^1\text{—}Y\text{—}(CH_2)_2SiH_x(R^2)_y(OR)_{3-x-y} \quad (Ib),$$

in which $R^1$ is a mono-, oligo- or perfluorinated alkyl group having 1–9 C atoms or a mono-, oligo- or perfluorinated aryl group, Y is a $CH_2$, O or S group, $R^2$ and R are each independently a linear, branched or cyclic alkyl group having 1–8 C atoms or an aryl group and x=0, 1 or 2 and y=0, 1 or 2, where (x+y)≦2, at a temperature in the range of 0–120° C. over a period of 0.5–24 hour and with thorough mixing in an alcoholic medium which contains water and (1) a weak mono- or polybasic acid or (2) a weak base or (3) a weak mono- or polybasic acid and a weak base or (4) an acidic or basic salt, the water and alkoxysilane employed being in a molar ratio of 2–500:1; and then applying the prepared fluoroalkyl-functional group containing organosiloxane based composition to said fillers and pigments.

4. The method of claim 3, wherein said weak base of (2) and (3) is an alkyl amine of formula (III):

$$H_{3-z}NR_z^3 \quad (III),$$

wherein $R^3$ is a linear, branched or cyclic alkyl group having 1–8 C atoms or a linear, branched or cyclic aminoalkyl group having 1–8 C atoms or an aryl group, z=1, 2 or 3 and groups $R^3$ are identical or different.

5. A method for coating glass fibers, comprising:

preparing a fluoroalkyl-functional group containing organosiloxane based composition, which is essentially chlorine free, by the controlled hydrolysis of at least one fluoroalkyl-functional group containing organosilane of formula Ia or Ib:

$$R^1\text{—}(CH_2)_2Si(R^2)_y(OR)_{3-y} \quad (Ia) \text{ or}$$

$$R^1\text{—}Y\text{—}(CH_2)_2SiH_x(R^2)_y(OR)_{3-x-y} \quad (Ib),$$

in which $R^1$ is a mono-, oligo- or perfluorinated alkyl group having 1–9 C atoms or a mono-, oligo- or perfluorinated aryl group, Y is $CH_2$, O or S group, $R^2$ and R are each independently a linear, branched or cyclic alkyl group having 1–8 C atoms or an aryl group and x=0, 1 or 2 and y=0, 1 or 2, where (x+y)≦2, at a temperature in the range of 0–120° C. over a period of 0.5–24 hours and with thorough mixing in an alcoholic medium which contains water and (1) a weak mono- or polybasic acid or (2) a weak base or (3) a mono- or polybasic acid and a weak base or (4) an acidic or basic salt, the water and alkoxysilane employed being in a molar ratio of 2–500:1; and then coating the glass fibers with the prepared fluoroalkyl-functional group containing organosiloxane based composition.

6. The method of claim 5, wherein said weak base of of (2) and (3) is an alkylamine of formula (III):

$$H_{3-z}NR_z^3 \quad (III),$$

wherein $R^3$ is a linear, branched or cyclic alkyl group having 1–8 C atoms or a linear, branched or cyclic aminoalkyl group having 1–8 C atoms or an aryl group, z=1, 2 or 3 and groups $R^3$ are identical or different.

* * * * *